(12) United States Patent
Renals

(10) Patent No.: US 10,773,346 B2
(45) Date of Patent: Sep. 15, 2020

(54) SYSTEM AND METHOD FOR ASSEMBLING A HEAT EXCHANGER

(71) Applicant: GENERAL ELECTRIC TECHNOLOGY GMBH, Baden (CH)

(72) Inventor: Stephen Michael Renals, Vernon, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/179,053

(22) Filed: Jun. 10, 2016

(65) Prior Publication Data
US 2017/0355047 A1    Dec. 14, 2017

(51) Int. Cl.
| | | |
|---|---|---|
| *B23P 15/26* | (2006.01) | |
| *F28F 9/26* | (2006.01) | |
| *F28D 7/08* | (2006.01) | |
| *F22B 21/02* | (2006.01) | |
| *B23K 31/12* | (2006.01) | |
| *B23K 31/02* | (2006.01) | |
| *F28F 9/18* | (2006.01) | |
| *F24H 9/00* | (2006.01) | |

(Continued)

(52) U.S. Cl.
CPC ............. *B23P 15/26* (2013.01); *B23K 31/02* (2013.01); *B23K 31/125* (2013.01); *F22B 21/02* (2013.01); *F24H 9/0005* (2013.01); *F28D 7/087* (2013.01); *F28F 1/00* (2013.01); *F28F 9/18* (2013.01); *F28F 9/26* (2013.01); *F28F 9/268* (2013.01); *B23K 2101/06* (2018.08); *B23K 2101/14* (2018.08); *F28D 2021/0024* (2013.01)

(58) Field of Classification Search
CPC ...... F28F 9/26; F28F 1/00; B23P 15/26; F24H 9/0005
See application file for complete search history.

(56) References Cited

U.S. PATENT DOCUMENTS

| 6,092,591 A | 7/2000 | McDonald et al. |
| 2010/0065159 A1 | 3/2010 | Hartwig et al. |

(Continued)

FOREIGN PATENT DOCUMENTS

| CH | 649 374 A5 | 5/1985 | |
| EP | 0373102 A2 * | 6/1990 | ............ F28F 9/187 |

(Continued)

OTHER PUBLICATIONS

FR 1465673 A machine translation.*
(Continued)

*Primary Examiner* — Gordon A Jones
(74) *Attorney, Agent, or Firm* — Grogan, Tuccilllo & Vanderleeden, LLP

(57) ABSTRACT

A method of assembling a heat exchanger includes the steps of fluidly connecting a plurality of first heat exchanger tubes to a first connecting tube portion at an assembly location to form a first subassembly, fluidly connecting a plurality of second heat exchanger tubes to a second connecting tube portion at the assembly location to form a second subassembly, transporting the first subassembly and the second subassembly from the assembly location to an installation location, and connecting the first subassembly to the second subassembly at a single connection point between the first connecting tube portion and the second tube connecting portion.

10 Claims, 3 Drawing Sheets

(51) Int. Cl.
    *F28F 1/00*         (2006.01)
    *F28D 21/00*     (2006.01)
    *B23K 101/14*    (2006.01)
    *B23K 101/06*    (2006.01)

(56) References Cited

U.S. PATENT DOCUMENTS

2011/0290464 A1* 12/2011 Mabes .................... B23P 15/26
                                                                             165/173
2013/0180696 A1* 7/2013 Magee ...................... F28F 1/00
                                                                             165/175

FOREIGN PATENT DOCUMENTS

| FR | 814069 A | * | 11/1936 | ............ F28F 9/0236 |
|----|----------|---|---------|--------------------------|
| FR | 1465673 A | * | 1/1967 | ................ F28F 9/26 |
| GB | 733647 | * | 7/1955 | ............ F16L 13/007 |
| GB | 1 402 719 A | | 8/1975 | |

OTHER PUBLICATIONS

FR 814069 A machine translation.*
EP 0373102 A2 machine translation.*
FR 1465673 (B) human translation.*
International Search Report and Written Opinion issued in connection with corresponding PCT Application No. PCT/EP2017/062939 dated Jul. 31, 2017.

* cited by examiner

SYSTEM AND METHOD FOR ASSEMBLING A HEAT EXCHANGER

BACKGROUND

Technical Field

Embodiments of the invention relate to power plants and power generation and, more particularly, to a system and method for assembling a heat exchanger for a boiler of a power generation plant.

DISCUSSION OF ART

Boilers are utilized as heat exchangers in numerous applications. Boilers typically utilize heat transfer liquid within a tube to absorb heat from an outside source, and then transfer a substantially liquid-free vapor fraction of the heated fluid to a desired location for use. For example, boilers or steam generators are commonly used in the power generation industry to produce steam for subsequent use in a power generation process (e.g., in a steam turbine) by passing hot gases through an enclosed duct so as to heat fluid in tube bundles disposed across the duct. The hot gases may be produced by firing burners at the base of the boiler, or the hot gas may be the hot exhaust gas of a gas turbine as found in many power plants.

One particular form of a steam generator may be formed of several sections constructed in modular fashion. Such sections are well known in the art as a preheater (low pressure economizer), economizer (high pressure economizer), evaporator and superheater. The economizer, evaporator and superheater may all be in fluid communication with a steam drum or separator located outside the hot exhaust path.

Many boilers may have arrays of horizontally-arranged heat exchanger tubes over which a vertical flow of hot gases may pass, although other arrangements utilize vertical tube banks over which a generally horizontal flow of hot exhaust gases pass. In existing boiler systems, and particularly with boiler systems utilizing horizontally-arranged heat exchanger tubes, assembly is very time consuming and labor intensive. In particular, each heat exchanger tube must be welded in the field to an adjoining tube. With many systems having multiple banks of tubes with upwards of 150 tubes in each bank, connecting the tubes may involve upwards of 1,300 welds that are made in the field. In many applications, radiographic testing of the field welds to identify any defects is also necessary, which can be quite tedious and add substantial labor costs.

In view of the above, there is a need for a system and method for connecting adjoining heat exchanger tubes to one another to form a heat exchanger that is easier and more cost effective than existing methods.

BRIEF DESCRIPTION

In an embodiment, a method of assembling a heat exchanger is provided. The method includes the steps of fluidly connecting a plurality of first heat exchanger tubes to a first connecting tube portion at an assembly location to form a first subassembly, fluidly connecting a plurality of second heat exchanger tubes to a second connecting tube portion at the assembly location to form a second subassembly, transporting the first subassembly and the second subassembly from the assembly location to an installation location, and connecting the first subassembly to the second subassembly at a single connection point between the first connecting tube portion and the second tube connecting portion.

In another embodiment, a heat exchanger for a boiler is provided. The heat exchanger includes a first tube assembly including at least one first heat exchanger tube extending across a gas flow path, a first connecting tube portion fluidly connected to the at least one first heat exchanger tube, the first connecting tube portion having a closed end and an open end, a second tube assembly including at least one second heat exchanger tube extending across the gas flow path, a second connecting tube portion fluidly connected to the at least one second heat exchanger tube, the second connecting tube portion having a closed end an open end, wherein the respective open ends of the first and second connecting tube portions are connected to one another at a single connection point to define a connecting tube that extends substantially perpendicular to the first and second heat exchanger tubes.

In yet another embodiment, an assembly facilitation apparatus for a heat exchanger is provided. The apparatus includes a first connecting tube portion configured to receive a plurality of first heat exchanger tubes so as to provide fluid communication between the first connecting tube portion and the plurality of first heat exchanger tubes, the first connecting tube portion having a closed end and an open end, and a second connecting tube portion configured to receive a plurality of second heat exchanger tubes so as to provide fluid communication between the second connecting tube portion and the plurality of second heat exchanger tubes, the second connecting tube portion having a closed end and an open end. The open end of the first connecting tube portion and the open end of the second connecting tube portion are configured to be joined together by a weld made at an installation location of the heat exchanger.

DRAWINGS

The present invention will be better understood from reading the following description of non-limiting embodiments, with reference to the attached drawings, wherein below:

DETAILED DESCRIPTION

Figure 1:
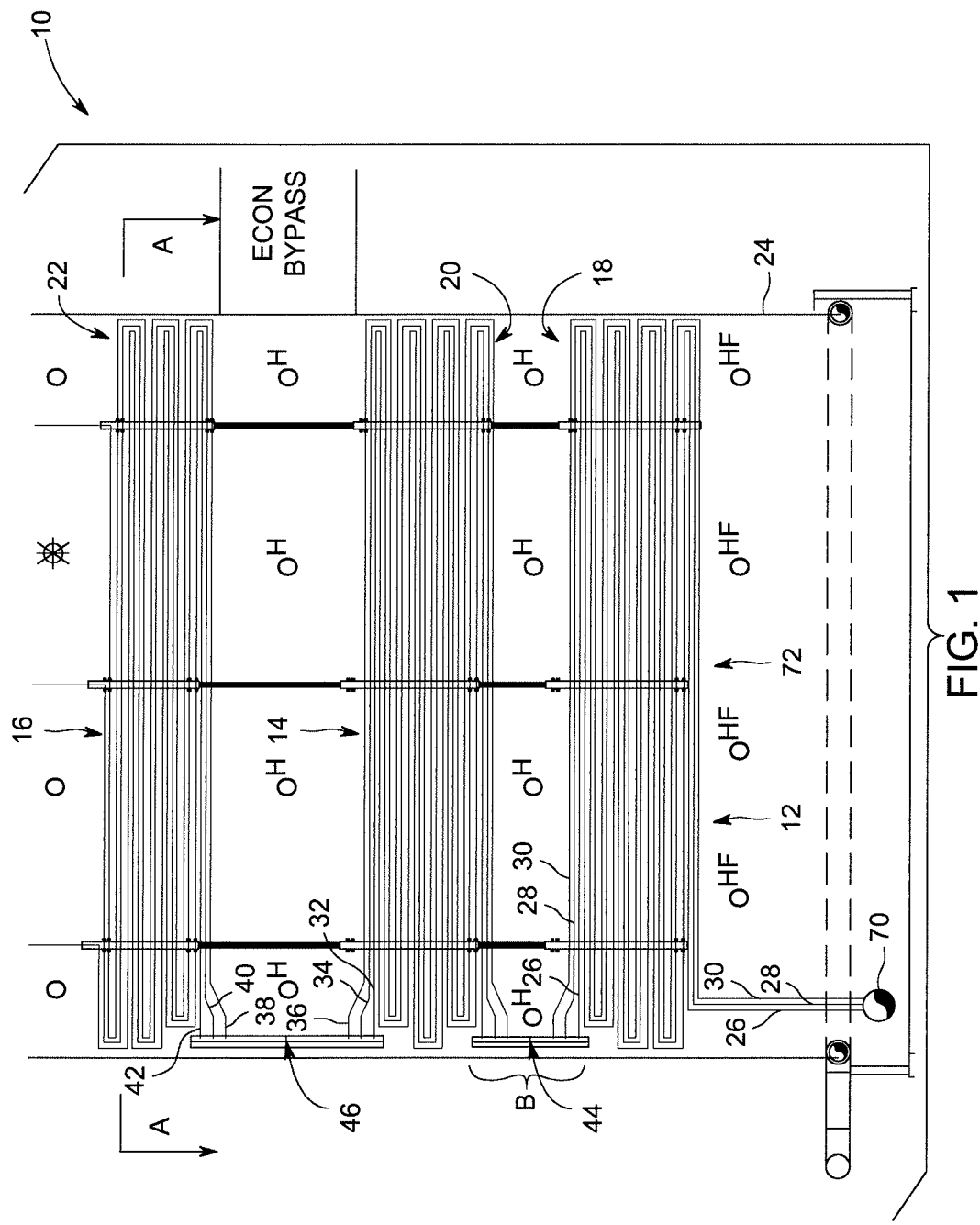
FIG. 1 is a simplified side elevational view of a heat exchanger portion of a boiler, having a plurality of heat exchanger tube assemblies, according to an embodiment of the invention.

Reference will be made below in detail to exemplary embodiments of the invention, examples of which are illustrated in the accompanying drawings. Wherever possible, the same reference characters used throughout the drawings refer to the same or like parts. While embodiments of the invention are directed to a system and method for assembling a heat exchanger having a plurality of horizontal heat exchanger tubes, embodiments of the invention may also be applicable for assembling a heat exchanger having a plurality of vertically-arranged heat exchanger tubes. More specifically, a horizontal heat exchanger assembly of a steam generator has been selected for clarity of illustration. Other suitable implementations may include horizontal boiler assemblies for circulating fluidized bed boilers, heat recovery, industrial, tower and two pass steam generator designs.

As used herein, "operatively coupled" refers to a connection, which may be direct or indirect. The connection is not necessarily being a mechanical attachment. As used herein, "mechanically coupled" refers to any coupling method capable of supporting the necessary forces between components. As used herein, the expression "fluidly coupled" or "fluid communication" refers to an arrangement of two or more features such that the features are connected in such a way as to permit the flow of fluid between the features and permits fluid transfer. As used herein, "field weld" refers to a weld made in the field, at the ultimate installation site for a component, such that the component that is a part of the weld is not thereafter moved or intended to be move. As used herein, "shop weld" or "off-site weld" refers to a weld made prior to transporting the components that are connected by the weld to an ultimate installation site, such that the component is intended to be moved or transported thereafter to its final installation location.

Figure 2:
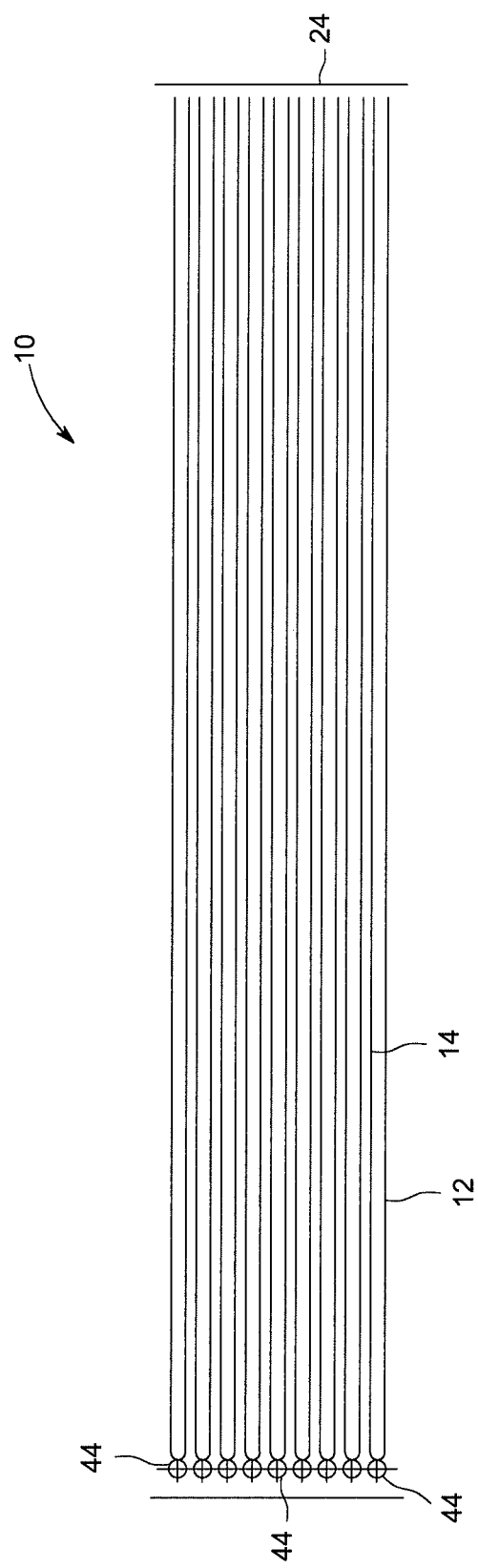
FIG. 2 is a top, cross-sectional view of the heat exchanger portion of the boiler of FIG. 1, taken along line A-A of FIG. 1.

Embodiments of the invention relate to a heat exchanger for a boiler, and a method for assembling a heat exchanger for a boiler. With reference to FIG. 1, the heat exchanger may be embodied in the heat exchange portion 10 (e.g., an economizer) of a steam generator. As illustrated therein, the heat exchange portion 10 of the boiler may include a plurality of tube banks, such as tube banks 12, 14, 16 arranged one above the other in a vertical direction. For example, tube bank 12 may be considered a lower tube bank while tube bank 14 may be considered an upper tube bank. The tube banks 12, 14, 16 may each include a plurality of tube assemblies stacked one behind the other, as illustrated in FIG. 2. In FIG. 1, only the forward-most tube assembly (e.g., tube assemblies 18, 20, 22) of each tube bank 12, 14, 16, respectively, can be seen.

Each tube assembly 18, 20, 22 includes a plurality of tubes that extend substantially horizontally across a gas flow path defined by a duct 24. In an embodiment, the duct 24 may be a duct of a steam generator. As shown, tube assembly 18 of the lower tube bank 12 includes three tubes 26, 28, 30 that extend in a serpentine-like fashion across the duct 24 to define multiple passes across the duct 24. For example, as shown therein, tubes 26, 28, 30 make eight passes across the duct 24. In certain embodiments, each tube 26, 28, 30 may make as few as two passes, or even a single pass, across the duct 24, or more than eight passes across the duct 24 depending on system parameters and specifications.

Likewise tube assembly 20 of tube bank 14 includes three tubes 32, 34, 36 that extend, similarly, in a serpentine-like fashion across the duct 24. Tube assembly 22 is also shown as having three tubes 38, 40, 42 that are configured in a similar manner. In embodiments, the number of passes across the duct for each tube 32, 34, 36, or 38, 40, 42, may be the same or different from the number of passes made by the other tube assemblies. In addition, the number of tubes in each tube assembly may be the same as in each other assembly. In other embodiments, each assembly may 18, 20, 22 may have a different number of tubes that extend across the duct 24. In yet other embodiments, each tube assembly of each tube bank may be configured with a different number of tubes. In various embodiments, the length of each tube pass may be approximately 30-65 feet. In embodiments, each tube assembly may have anywhere from 3-8, or an even greater number, of tubes.

With further reference to FIG. 1, each tube assembly in the lower tube bank 12 is fluidly coupled to a corresponding tube assembly in the upper tube bank 14 by a vertical connecting tube 44. Likewise, each tube assembly in the tube bank 14 is fluidly coupled to a corresponding tube assembly in tube bank 16 by a connecting tube 46.

Figure 3:
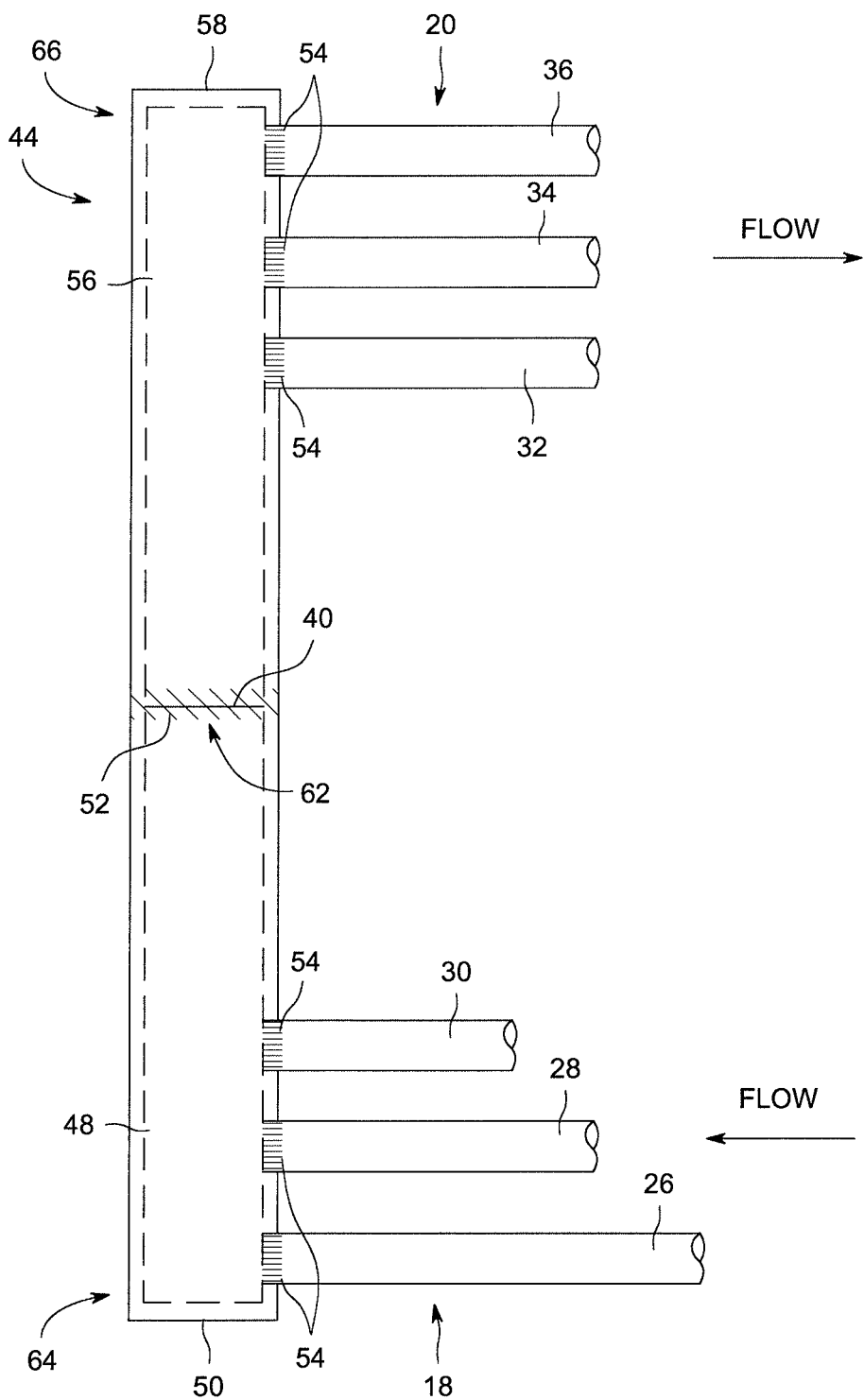
FIG. 3 is an enlarged, detail view of area B of FIG. 1, showing an assembly facilitation tube according to an embodiment of the invention.

Turning now to FIG. 3, connecting tube 44 is illustrated in further detail (connecting tube 46 being substantially identical). As illustrated therein, connecting tube 44 includes a first connecting tube portion 48 that is generally cylindrical in shape and has a first, capped end 50 and a second, open end 52 opposite the first end 50. The first connecting tube portion 48 is fluidly connected to the tubes 26, 28, 30 of the tube assembly 18 of the lower tube bank 12. For example, each tube 26, 28, 30 of the tube assembly 18 may be secured to the first connecting tube portion 48 via shop welds 54 so as to provide for fluid communication between the tubes 26, 28, 30 and the first connecting tube portion 48, as discussed in detail hereinafter. The first connecting tube portion 48 and the tube assembly 18 connected thereto is referred to herein as a first subassembly 64. Each tube assembly (and the tubes thereof) of the tube bank 12 may likewise be connected to a respective first connecting tube portion of a similar connecting tube 44, as shown in FIG. 2, such that each tube assembly of the tube bank 12 is connected to a connecting tube.

As further shown in FIG. 3, connecting tube 44 also includes a second connecting tube portion 56 that is generally cylindrical in shape and has a first, capped end 58 and a second, open end 60 opposite the first end 58. The second connecting tube portion 56 is fluidly connected to the tubes 32, 34, 36 of the tube assembly 20 of the upper tube bank 14. For example, each tube 32, 34, 36 of the tube assembly 20 may be secured to the second connecting tube portion 56 via shop welds 54 so as to provide for fluid communication between the tubes 32, 34, 36 and the second connecting tube portion 56. The second connecting tube portion 56 and the tube assembly 20 connected thereto is referred to herein as a second subassembly 66. Each tube assembly (and the tubes thereof) of the tube bank 14 may likewise be connected to a respective second connecting tube portion of a similar connecting tube 44, as shown in FIG. 2, such that each tube assembly of the tube bank 14 is connected to a connecting tube. In an embodiment, the connecting tube 44 (and the first and second connecting tube portions 48, 56 thereof) is approximately 2-4 inches in diameter. In an embodiment, the tubes are welded to the respective connecting tube portions such that the tubes extend substantially perpendicular from the connecting tube portions.

As also illustrated in FIG. 3, the respective open ends 52, 60 of the first and second connecting tube portions 48, 56 are joined to one another via a field weld 62 so as to provide for fluid communication between the first connecting tube portion 48 and the second connecting tube portion 56. In this manner, fluid and/or steam flowing through the lower tube bank 12, e.g., tubes 26, 28, 30 of the tube assembly 18 is permitted to flow into the connecting tube 44 and then to the upper tube bank 14, e.g., tubes 32, 34, 36 of the tube assembly 20. More generally speaking, each connecting tube 44, 46 is utilized to fluidly couple a tube assembly to a corresponding tube assembly located above it.

During assembly, each tube assembly (e.g., tube assembly 18 and tubes 26, 28, 30 thereof) of the tube bank 12 may be welded to a first connecting tube portion 48 of a connecting tube 44 off-site from the power plant or boiler in which the tube banks 12 are to be finally installed, to form subassembly 64. This process may be repeated for each tube assembly in the tube bank 12, whereby the tubes of each tube assembly are welded to a respective first connecting tube portion of a respective connecting tube. Similarly, each tube assembly (e.g., tube assembly 20 and tubes 32, 34, 36 thereof) of the tube bank 14 may be welded to a second connecting tube portion 56 of the connecting tube 46 off-site, to form subassembly 66. This process may likewise be repeated for each tube assembly in the tube bank 14, whereby the tubes of each such tube assembly are welded to a respective second connecting tube portion of a respective connecting tube.

Upon making each welded connection 54, and prior to shipping each subassembly, radiographic testing of the field welds 54 to identify any defects can also be performed off-site. Any defects or insufficient welds may therefore be repaired prior to shipping the subassemblies to the boiler installation site. Once all of the tube assemblies are welded to a respective connecting tube portion, and after testing the welds, these subassemblies 64, 66 are shipped to a power plant or other site at which the boiler is installed.

Once on site, the subassemblies 64, 66 of each tube bank may then be positioned and secured within the boiler. For example, subassembly 64 including first connecting tube portion 48 and tubes 26, 28, 30 may be positioned within the heat exchange portion 10 of a boiler so that the tubes 26, 28, 30 extend across the gas flow path defined by duct 24. Subassembly 66 including second connecting tube portion 56 and tubes 32, 34, 36 may then be positioned within the heat exchange portion 10 of the boiler above subassembly 64 so that tubes 32, 34, 36 likewise extend across the gas flow path. The respective open ends 52, 60 of the first and second connecting tube portions 48, 56 are brought into registration within one another and welded in the field (i.e., within the heat exchange portion 10) to provide fluid communication between the tube assembly 18 of the lower tube bank 12 and the tube assembly 20 of the upper tube bank 14. This process may be repeated for each tube assembly of the respective tube banks to interconnect each tube assembly with the corresponding tube assembly located above it.

By welding each tube of a respective tube assembly to a connecting tube prior to delivering the welded subassemblies to the field, the number of in-field welds needed to connect the tube banks to one another may be substantially reduced. In particular, with existing systems and methods, without connecting tubes, each tube in an upper tube bank must be bent down and each tube in a lower tube bank must be bent up so that these tubes can be fitted and welded one-by-one. More specifically, existing methods require each individual tube (e.g., tube 26, tube 28, tube 30) of a tube assembly (e.g., tube assembly 18) to be bent upwards, while each individual tube (e.g., tube 32, tube 34, tube 36) is be bent downwardly. Two welds are then necessary to connect each lower tube to its corresponding upper tube. To connect two tube assemblies, each containing three tubes, 6 field welds are therefore needed.

With the present invention, however, by shop-welding each tube to a connecting tube portion off-site to form a subassembly, only a single field weld (i.e., field weld 62) is needed to connect each lower tube assembly to its corresponding upper tube assembly. The number of field welds required to connect each lower tube assembly to each upper tube assembly is therefore reduced from 6 to 1. As a result, in-field installation is greatly simplified and both installation time and cost savings may be realized. In particular, by pre-welding the tube assemblies to a connecting portion of a connecting tube off-site, only a single field weld is needed on-site. This eliminates the need to carefully align each tube of each assembly with its corresponding tube in the bank above it, which can be particularly challenging given tight spaces and the significant size of each tube. Moreover, by performing weld diagnostics and testing on the welds 54 between the tubes and the connecting tube portions prior to in-field installation, the time, difficulty and expense of testing the welds 62 in field is greatly reduced.

Once assembled, and in operation, fluid can be supplied to each of the tubes 26, 28, 30 of the lower tube bank 12 through an inlet 70. The fluid is passed through the serpentine tubes (including tubes 26, 28, 30) of the lower tube bank 12, into the connecting tubes 44 joining the lower tube bank 12 with the upper tube bank 14, and into the tubes 32, 34, 36 of the upper tube bank 14. The fluid may then continue to pass through such tubes and into the connecting tubes 46 joining tube bank 14 with tube bank 16. Throughout this flowpath, the fluid within the tubes will be heated via heated gas flow 72 within the duct 24 to form steam. The steam and any unevaporated fluid may then be output for further heating and/or for ultimate use in one or more power generation processes.

In an embodiment, a method of assembling a heat exchanger is provided. The method includes the steps of fluidly connecting a plurality of first heat exchanger tubes to a first connecting tube portion to form a first subassembly, fluidly connecting a plurality of second heat exchanger tubes to a second connecting tube portion to form a second subassembly, transporting the first subassembly and the second subassembly to an installation location, and connecting the first subassembly to the second subassembly at a single connection point between the first connecting tube portion and the second tube connecting portion. In an embodiment, fluidly connecting the plurality of first heat exchanger tubes to the first connecting tube portion includes welding each of the first heat exchanger tubes to the first connecting tube portion off-site from the installation location, and fluidly connecting the plurality of second heat exchanger tubes to the second connecting tube portion includes welding each of the second heat exchanger tubes to the second connecting tube portion off-site from the installation location. In an embodiment, the method may also include testing the welds between the first heat exchanger tubes and the first connecting tube portion and the welds between the second heat exchanger tubes and the second connecting tube portion prior to transporting the first and second subassemblies to the installation location. In an embodiment, testing the welds may include radiographic testing of the welds. In an embodiment, the first connecting tube portion includes an open end and a closed end and the second connecting tube portion includes an open end and a closed end. The step of connecting the first subassembly to the second subassembly may include welding the open end of the first connecting tube portion to the open end of the second connecting tube portion at the installation location. In an embodiment, the first connecting tube portion and the second connecting tube portion are oriented substantially perpendicularly from the plurality of first heat exchanger tubes and the plurality of second heat exchanger tubes, respectively. In an embodiment, the first connecting tube portion and the second connecting tube portion are between approximately 2 inches and 4 inches in diameter. In an embodiment, the first heat exchanger tubes and the second heat exchanger tubes are serpentine-shaped. In an embodiment, the method may also include the steps of positioning the first heat exchanger tubes within a gas flow duct such that the first heat exchanger tubes extends substantially across the gas flow duct, and positioning the second heat exchanger tubes within the gas flow duct such that the second heat exchanger tubes extends substantially across the gas flow duct. In an embodiment, the gas flow duct extends substantially vertically, and the first heat exchanger tubes and the second heat exchanger tubes extend substantially horizontally. In an embodiment, the method may also include the step of arranging the first and second subassemblies within the duct such that the second subassembly is positioned substantially above the first subassembly. In an embodiment, the plurality of first heat exchanger tubes is three first heat exchanger tubes, and the plurality of second heat exchanger tubes is three second heat exchanger tubes.

In another embodiment, a heat exchanger for a boiler is provided. The heat exchanger includes a first tube assembly including at least one first heat exchanger tube extending across a gas flow path, a first connecting tube portion fluidly connected to the at least one first heat exchanger tube, the first connecting tube portion having a closed end and an open end, a second tube assembly including at least one second heat exchanger tube extending across the gas flow path, a second connecting tube portion fluidly connected to the at least one second heat exchanger tube, the second connecting tube portion having a closed end an open end, wherein the respective open ends of the first and second connecting tube portions are connected to one another at a single connection point to define a connecting tube that extends substantially perpendicular to the first and second heat exchanger tubes. In an embodiment, the at least one first heat exchanger tube and the first connecting tube portion are fluidly connected to one another via at least one first weld, wherein the first welds are made prior to positioning the at least one first heat exchanger tube across the gas flow path, and the at least one second heat exchanger tube and the second connecting tube portion are fluidly connected to one another via at least one second weld, wherein the second welds are made prior to positioning the at least one second heat exchanger tube across the gas flow path. In an embodiment, the gas flow path includes a duct of a steam generator. In an embodiment, the at least one first heat exchanger tube is generally serpentine-shaped and extends in multiple passes across the duct, and the at least one second heat exchanger tube is generally serpentine-shaped and extends in multiple passes across the duct. In an embodiment, the respective open ends of the first and second connecting tube portions are connected to one another via a field weld at the single connection point to form the connecting tube.

In yet another embodiment, an assembly facilitation apparatus for a heat exchanger is provided. The apparatus includes a first connecting tube portion configured to receive a plurality of first heat exchanger tubes so as to provide fluid communication between the first connecting tube portion and the plurality of first heat exchanger tubes, the first connecting tube portion having a closed end and an open end, and a second connecting tube portion configured to receive a plurality of second heat exchanger tubes so as to provide fluid communication between the second connecting tube portion and the plurality of second heat exchanger tubes, the second connecting tube portion having a closed end and an open end. The open end of the first connecting tube portion and the open end of the second connecting tube portion are configured to be joined together by a weld made at an installation location of the heat exchanger. In an embodiment, the first connecting tube portion is configured to be joined to the plurality of first heat exchanger tubes by shop welds made off-site from the installation location, and the second connecting tube portion is configured to be joined to the plurality of second heat exchanger tubes by shop welds made off-site from the installation location.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described system and method without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A heat exchanger for a boiler, comprising:
    a first plurality of tubes;
        a first connecting tube fluidly connected to the first plurality of tubes, the first connecting tube having a first closed end, a first open end, and a first tube portion extending therebetween having a first plurality of apertures defined therethrough, wherein each aperture of the first plurality of apertures is in fluid communication with a respective tube of the first plurality of tubes;
a second plurality of tubes;
a second connecting tube fluidly connected to the second plurality of tubes, the second connecting tube, having a second closed end and a second open end, and a second tube portion extending therebetween having a second plurality of apertures defined therethrough, wherein each aperture of the second plurality of apertures is in fluid communication with a respective tube of the second plurality of tubes;
wherein the first and second open ends of the first and second connecting tubes are connected to one another to define a joint therebetween and wherein the first and second connecting tubes are in fluid communication through the joint.

2. The heat exchanger of claim 1, wherein:
at least one tube of the first plurality of tubes and the first connecting tube portion are fluidly connected to one another via at least one first weld, wherein the first weld is made prior to positioning the at least one tube of the first plurality across a gas flow path; and
at least one tube of the second plurality of tubes and the second connecting tube are fluidly connected to one another via at least one second weld, wherein the second weld is made prior to positioning the at least one tube of the second plurality across the gas flow path.

3. The heat exchanger of claim 2, wherein:
the gas flow path includes a duct of a heat recovery steam generator.

4. The heat exchanger of claim 3, wherein:
the at least one tube of the first plurality is generally serpentine-shaped and extends in multiple passes across the duct; and
the at least one tube of the second plurality is generally serpentine-shaped and extends in multiple passes across the duct.

5. The heat exchanger of claim 2, wherein:
the respective open ends of the first and second connecting tubes are connected to one another via a field weld to form the joint.

6. An assembly facilitation apparatus for a heat exchanger, comprising:

a first connecting tube having a first closed end, a first open end, and a first tube extending therebetween having a first aperture defined therethrough, and configured to receive a first heat exchanger tube thereat to provide fluid communication between the first connecting tube portion and the first heat exchanger tube; and
a second connecting tube having a second closed end, a second open end, and a second tube portion extending therebetween having a second aperture defined therethrough, and configured to receive a second heat exchanger tube thereat so as to provide fluid communication between the second connecting tube portion and the second heat exchanger tube;
wherein the open end of the first connecting tube and the open end of the second connecting tube are configured to be joined together to define a seam therebetween by a weld made at an installation location of the heat exchanger.

7. The assembly facilitation apparatus of claim 6, wherein:
the first connecting tube is configured to be joined to the first heat exchanger tube by shop welds made off-site from the installation location; and
the second connecting tube is configured to be joined to the second heat exchanger tube by shop welds made off-site from the installation location.

8. The heat exchanger of claim 1,
wherein the first connecting tube extends substantially perpendicular to the at least one first heat exchanger tube; and
wherein the second connecting tube extends substantially perpendicular to the at least one second heat exchanger tube.

9. The heat exchanger of claim 1, wherein the at least one first heat exchanger tube and the at least one second heat exchanger tube are in fluid communication via the connected first and second connecting tubes.

10. The heat exchanger of claim 6, wherein the first heat exchanger tube and the second heat exchanger tube are configured to be in fluid communication through the first and second connecting tubes.

* * * * *